United States Patent [19]

Lashbrook

[11] Patent Number: 4,817,387
[45] Date of Patent: Apr. 4, 1989

[54] TURBOCHARGER/SUPERCHARGER CONTROL DEVICE

[75] Inventor: Larry D. Lashbrook, Fort Lauderdale, Fla.

[73] Assignee: Hamilton C. Forman, Trustee, Fort Lauderdale, Fla.

[21] Appl. No.: 923,578

[22] Filed: Oct. 27, 1986

[51] Int. Cl.[4] .............................................. F02B 33/44
[52] U.S. Cl. ......................................... 60/611; 60/600
[58] Field of Search .................... 60/600, 611; 123/564

[56] References Cited

U.S. PATENT DOCUMENTS

| | | | |
|---|---|---|---|
| 3,651,636 | 3/1972 | Glassey et al. | 60/611 |
| 4,150,545 | 4/1979 | Yamazaki | 60/611 |
| 4,222,240 | 9/1980 | Castellano | 60/611 |
| 4,227,372 | 10/1980 | Kakimoto et al. | 60/602 |
| 4,387,573 | 6/1983 | Parker | 60/611 |
| 4,512,153 | 4/1985 | Kawabata et al. | 60/611 |
| 4,565,178 | 1/1986 | Nagase et al. | 123/564 |

Primary Examiner—Stephen F. Husar
Attorney, Agent, or Firm—Oltman and Flynn

[57] ABSTRACT

Turbocharger or supercharger for an internal combustion engine, which includes an exhaust turbine in the engine exhaust gas stream and a compressor in the fuel-/air mixture stream between the fuel/air source and the intake manifold for boosting the intake manifold pressure; a dedicated recirculation loop connecting the compressor output with its input and a recirculation control valve disposed in the recirculation loop for controlling the amount of airlfow in the recirculation loop. The recirculation control valve is linked to the engine power control linkage such that at high power, the recirculation is blocked while at low power the recirculation is unrestricted. As a result, at low power the turbine and compressor is kept running at a relatively high RPM due to the recirculation loop being open, and at suddenly increased power demand, power boost is immediately available without turbo lag due to the closing of the recirculation loop. A waste-gate may be provided in the exhaust manifold for protecting the turbine against overload. Instead of a waste-gate, the recirculation valve may be combined with an engine power sensor coupled jointly with the engine power control linkage to prevent engine overloading by maintaining circulation in the recirculation loop.

23 Claims, 4 Drawing Sheets

TURBOCHARGER/SUPERCHARGER CONTROL DEVICE

The invention relates to a control device for turbochargers or superchargers for internal combustion engines, and more particularly to turbochargers providing improved control and performance by means of a dedicated passageway and valve for recirculation of the fuel/air mixture.

This invention relates to the turbocharging or supercharging of internal combustion engines and, specifically, to a device for achieving greater control of, and performance from the turbocharger/engine system. This is achieved by means of a dedicated passageway located between the outlet and the inlet of the turbocharger compressor, and a valve which allows recirculation of the fuel/air mixture.

The advantages include: reduced lag, improved fuel distribution, modestly increased efficiency, reduced emissions; and, potentially, reduced system cost and greater reliability.

Turbochargers have long been known as adjuncts to internal combustion engines. A turbocharger increases the horsepower output of a given engine by supplying a greater quantity of fuel and air to the combustion chamber(s).

A turbocharger of the known construction includes a turbine wheel mounted on a common shaft with a rotary centrifugal compressor. The turbine wheel is positioned in the engine's exhaust passage where it is driven at a high rotational speed by the hot exhaust gases, while the compressor is positioned in the engine's intake passage. It may be located either ahead of the point of the carburetor(s) or fuel injector(s) (known as a blow-through turbocharger) or between the carburetor(s) or fuel injector(s) and the intake manifold (known as a draw-through turbocharger). In the blow-through type, only air passes through the turbocharger compressor; whereas, in the draw-through type, a fuel-air mixture passes through said compressor. Each system has its own advantages and disadvantages. This invention is concerned with the draw-through turbocharger (or supercharger system).

One of the major advantages of the draw-through system is the mixing action of the turbocharger on the fuel-air mixture passing through it. This improves fuel distribution and combustibility, thereby increasing efficiency. This invention further improves mixing by means of a dedicated recirculation loop which re-introduces part of the mixture back into the incoming air stream, thereby causing turbulence and better mixing. In addition, this mixture passes through the turbocharger again to be remixed.

A significant problem with turbocharger systems (commonly known as turbo lag), is the delay encountered between opening the throttle and having the engine respond proportionately. This problem is worst at idle conditions, and is usually not much better until highway speeds are reached.

This is caused primarily by the fact that at low to moderate speeds and loads, the turbocharger compressor impeller is turning too slowly to produce boost (positive manifold pressure), and time is required to accelerate it to the point that boost is produced. This invention allows a faster moving column of air to be recirculating and ready to produce boost when the valve is closed.

This is further enhanced by the fact that, due to the increased controllability offered by this system, a turbocharger which revs higher at a low engine output may be used.

The instant invention overcomes these problems described above and provides other advantages over the existing art, as will be described hereinbelow in more detail.

SUMMARY OF THE INVENTION

It is the primary object of the invention to overcome the problem of turbo lag. The invention, however, is capable of providing additional advantages depending upon the particular embodiment used.

The invention relates to the turbocharging of internal combustion engines and, specifically, to a concept for achieving greater control of and performance from the turbocharger/engine system. This is achieved by means of a dedicated recirculation passageway and a valve which allow recirculation of the fuel/air mixture around the compressor.

The basic concept of the invention was originally conceived as a means to reduce turbo lag. However, it may also be incorporated in various other different systems to provide other advantages instead of or in addition to this original purpose, depending on the construction of the particular system. These other advantages include: a small increase in efficiency, lower exhaust emissions, better fuel distribution, reduced system cost, and increased reliability. Not any one system can offer all of these advantages, but it is believed that the advantages most desired can be obtained without as much sacrificing of the other advantages as other systems in use today require.

This invention is unique in that it provides a means for part of the fuel-air mixture which is discharged from the turbocharger to be recirculated and re-introduced into the intake side of the turbocharger. This provides for better mixing: (a) because it passes through the turbocharger twice, and, (b) because of the turbulence that occurs as it is re-introduced into the air stream.

This invention also provides a valve for regulating and for shutting off the recirculation, thus providing for nearly instant boost (reduced lag), if the other parts of the system are designed in accordance with this end.

The mixing which occurs when the valve is open causes better fuel distribution and more efficient combustion. This effect is sufficient to offset the loss of efficiency sustained from the higher back pressure of a turbocharger, particularly a high-performance turbocharger.

This device may be used in conjunction with a waste gate on a very high-performance system, or it may be used in place of a waste gate by partially opening the valve when the desired boost pressure is reached. This can be done with boost pressure alone (diaphragm actuator), or in conjunction with electronic or electro-mechanical means. The advantage to eliminating the waste gate is that it is quite expensive and somewhat unreliable due to the conditions under which it must operate. This invention works on the cold side of the turbocharger and thus, can be made more economically without sacrificing reliability. Total system cost can therefore be reduced without acquiescing to the low performance of a "free-floating" system (a system without a waste gate or other means of control). The advantage of a system in which a quantity of energy is harnessed to perform useful work (mixing fuel with air)

rather than being dumped overboard (as with a waste gate) is evident.

The main advantages attained by the invention are:

1. Reduced Lag. It:
   a. allows the turbo to rev more quickly in some instances;
   b. allows the turbo to be maintained at a higher RPM and ready to boost when desired;
   c. allows a faster moving column of air to be ready when boost is desired.
2. Better control:
   a. It allows boost cut-in time and rate to be easily and inexpensively adjusted and tailored to the needs of the individual system. (No need to change expensive turbine housings—within limits.)
   b. It allows boost pressure to be controlled more reliably than a waste gate and more evenly than most waste gates. (Most waste gates are not damped and will flutter.)
   c. It allows for simple control of mixture heating. If the recirculation system is heated, then heat will be reduced or shut off as valve opening is reduced or shut. This will correspond with the conditions under which heated or cold mixtures are desirable for the engine.
3. Increased Efficiency:
   Although a turbocharger can increase the efficiency of an engine when in the boost mode, it can decrease the efficiency in the non-boost mode. This is due chiefly to higher back pressure on the exhaust system, and is particularly true of the higher-performance systems because of their smaller turbine nozzle area. Although this invention will not necessarily reduce that back pressure, it will make use of otherwise wasted energy to provide better mixing of the fuel-air charge. This will improve both distribution and combustibility, which will offset the negative effects on efficiency due to the back pressure. Further development should yield slightly higher gains in this area.
4. Reduced System Cost:
   a. It can in many systems eliminate the need for a waste gate.
   b. It can reduce cost of after-market installations because adjustability reduces the expense and time required to change turbine housings in order to tune the system for the desired performance.
   c. It can reduce the need to use a camshaft designed to produce greater low RPM torque. This has been done as a measure to compensate for lag (at the expense of high RPM torque). Since this invention reduces lag, this expense can be saved and good high RPM performance can be had as a bonus.
5. Increased Reliability:
   Typically, the most responsive systems on the market are waste gate-equipped. The waste gate is a valve placed in the engine exhaust to bypass excess exhaust gases around the turbine when a certain boost level is reached. Two problems that exist with this method are: waste gate sticking due to exhaust product deposits which may be aggravated by the waste gate's not opening often enough to clean the deposits off; and, waste gate overheating caused by the waste gate's opening too much, thereby causing excessive exhaust flow through the waste gate, resulting in premature failure. If a waste gate sticks closed, the engine may be destroyed in a matter of seconds. If it leaks, the system will suffer a performance loss proportional to the size of the leak. If a minimum lag is sought, the tendency would be to use a turbocharger housing size (which controls turbine nozzle size) of small area so that boost may be achieved at low RPM, and then bypass the excess exhaust at higher speeds. If this is carried to a sufficient extent to nearly eliminate lag, a great quantity of exhaust gases would be bypassed which is not good engineering practice in the first place, and the waste gate would tend to overheat.

A recirculation valve in the fuel-air stream, on the other hand, operates in a more friendly environment, and does not tend to clog or overheat. In addition, the mixture that is being recirculated is returned back into the air stream to be more thoroughly mixed and to improve over-all efficiency.

By using the present invention, in many engine systems, the waste gate can be eliminated altogether. The most responsive (having the least lag) systems, however, may still use a waste gate, but only to protect the turbo, not the engine. The waste gate in this case is used to protect the turbocharger from over-revving by bypassing exhaust gas when the turbocharger RPM approaches the danger zone. Various methods of sensing this may include:

a. Pitot tube placed at the output of the turbocharger;
b. Venturi-type flow sensor;
c. Proximity sensor;
d. Photo-electric emitter and detector; and
e. Audio frequency sensor.

The above means serve to sense the RPM of the turbocharger either directly or indirectly (i.e., flow is a function of impeller RPM regardless of whether the flow is recirculated or not.)

If for any reason it is still desirable to use the waste gate or control boost as well as turbocharger RPM, this can still be done. Tow hoses, one from the intake manifold, and one from a flow sensor (pitot tube, for instance), with check valves in each to prevent backflow, can be joined and connected to the waste gate diaphragm.

Of course, more accurate regulation of the entire system can be achieved by the use of an on-board engine computer, various sensors and the appropriate actuators.

The following describes various alternate embodiments of the invention.

The main concept of the invention resides in the concept of air-fuel recirculation in a draw-through type turbocharger (or supercharger). The exact details by which this recirculation is achieved or controlled is immaterial to the scope of the invention.

There may be any number of paths for recirculation or any type of valve or regulating means to control the flow based on any number of parameters sensed and activated by any type of actuator. There may further be any shape or configuration used to produce different flow patterns or rate, etc., but these should only be regarded as alternate embodiments to the basic principle described herein.

A few alternate embodiments are:
1. A spring-loaded relief valve may be used in place of a butterfly valve or flapper valve in the recirculation loop. It may be adjustable for different boost pressures and would be used only to control boost pressure.
2. A relief valve as described above may be mounded in parallel with the butterfly or flapper valve so that it may control boost pressure. The other valve will then only control recirculation before boost is reached, instead of performing both functions. This arrangement is of advantage with certain types of linkage or control circuits.

3. A venturi may be placed in the input side of the turbocharger into which the recirculating mixture is introduced.

Some of the advantages of a recirculating system are also applicable to a mechanically driven supercharger, so that better mixing, control of the boost, and more even regulation of the boost over the entire RPM range may be attained. (The latter is more of a problem on the centrifugal-type superchargers than on the positive displacement type.)

Since in the instant turbocharger the RPM can be independent of boost pressure (in the recirculating mode), some means, other than the sensing of boost pressure must be used to prevent turbocharger overspeeding.

This can be achieved by:

1. The dimensioning of various components such as turbine housings, exhaust restrictions after the turbo, limiting of recirculation capacity so that boost still occurs before overspeed, and then using a waste gate in conventional manner.
2. Operating waste gate or other control device with a photoelectric device (infrared emitter and detector which senses turbocharger speed).
3. Operating waste gate or other control device with a proximity sensor which senses the points on the nut holding the compressor impeller on its shaft, for instance.
4. Controlling the waste gate with an audio frequency sensor which senses the variation in the pitch of the sound vibrations at different turbocharger speeds.
5. Operating the waste gate or other control device with a Pitot tube located in the outer air stream of the compressor which serves to sense the flow rate even in the absence of boost, and operate the waste gate or other control device.

In the most basic embodiment, the rotary compressor of the turbocharger, according to the inventive concept, is disposed in the fuel/air duct between the carburetor or fuel injector and the engine intake manifold with a bypass duct containing a controlled recirculating valve connecting the compressor's input and output ports. At lower power settings, the recirculating valve is completely or partially open, so that the turbine with compressor attached thereto can run in the idling condition wherein it only recirculates the fuel/air mixture.

In this low power condition, part of the fuel/air mixture is being recirculated in the compressor bypass duct which, due to turbulence and the additional passes through the compressor, insures much improved mixing of the fuel vapors with the air, which in turn leads to better fuel combustion and fuel efficiency, lower exhaust emissions and better fuel distribution.

Further still, in case of sudden acceleration when increased or full power is required from the engine, the recirculation valve is closed by the throttle valve linkage or other valve control system, which senses the need for increased power, and as a result, the engine intake pressure is rapidly increased as soon as the recirculation valve is closed, due to the fact that the turbine and compressor wheels were already rotating at a higher speed of rotation, without incurring the usual turbolag, resulting from the coupled turbine and compressor wheels needing to come up to speed. The inherent inertia in the turbine and compressor wheels ensures a rapid rise in intake manifold pressure with a resultant quick power response of the engine.

According to another feature of the invention, the recirculating valve is configured as a three-way valve disposed at the junction between the engine intake port, the compressor outlet port and the inlet port to the recirculation loop. In the latter embodiment, in one extreme position of the recirculation valve, the engine intake port is almost closed to the point of admitting only enough fuel/air mixture to allow the engine to idle, while the recirculation loop is almost or completely open, allowing free, or almost free flow of fuel/air mixture in the recirculation loop. In the other extreme position the recirculation valve is completely closing the recirculation duct, while the compressor output to the engine intake port is completely open, providing maximum engine power boost.

The recirculating valve may, in one embodiment be coupled to the throttle linkage such that increasing the power setting automatically causes increasing closing of the recirculation loop.

The recirculation valve may, in another embodiment, be controlled by the manifold pressure so that increasing manifold pressure causes increasing closing of the recirculation loop.

In accordance with still another feature, a waste-gate may be added in the form of an exhaust port for letting the exhaust gases bypass the exhaust turbine, in response to waste-gate control means, in order to protect the turbine wheel and/or the engine at high power settings.

In accordance with still another feature, waste-gate control means are provided which are coupled to an airflow sensor such that increasing intake of fuel/air mixture flow beyond a certain limit leads to opening the waste-gate.

In accordance with still another feature, the waste-gate control means are provided which are coupled to a turbocharger rotational speed sensor such that increasing turbocharger speed beyond a certain limit leads to opening the waste gate.

In accordance with still another feature, a pitot tube is included as an airflow sensor, having a pressure sensing device controllingly engaging the waste-gate such that increasing airflow beyond a certain limit leads to opening the waste gate.

In still another embodiment, a rotational speed sensor is provided which is coupled to the compressor wheel for sensing its rotational speed, and wherein the speed sensor is responsive to the pitch of the sound waves generated by the turbocharger for sensing the speed of the turbocharger.

In still another embodiment a pivotally suspended air vane is disposed in the fuel/air flow which is controllingly engaging the recirculation valve such that increased air pressure on the vane leads to increasingly closing of the recirculation valve or increasingly opening the waste-gate.

In still another embodiment a venturi may be disposed in the fuel/air mixture flow wherein the inlet to the recirculated loop is fluidly communicating with the venturi such that increasing airflow in the venturi leads to improved fuel-air mixing.

Further objects and advantages of this invention will be apparent from the following detailed description of a presently preferred embodiment which is illustrated schematically in the accompanying drawings.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

DESCRIPTION OF THE PREFERRED EMBODIMENTS

Figure 1:
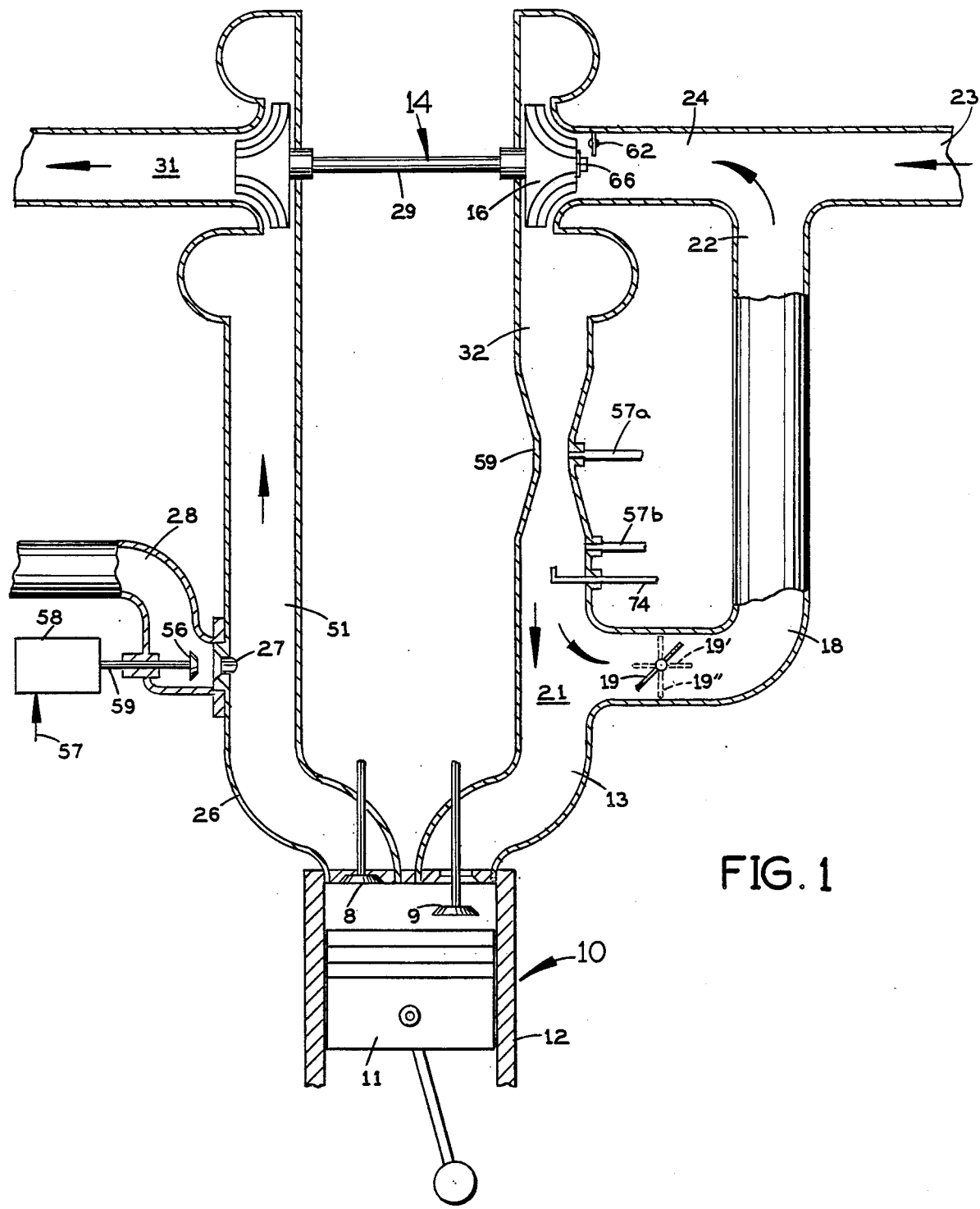
FIG. 1 is a diagrammatic view of an engine with a turbocharger according to the inventive concept, showing an exhaust turbine coupled to a rotary compressor in the engine fuel/air intake and a recirculatory loop connecting the compressor inlet and outlet.

FIG. 1 shows in diagrammatic form the basic parts of a single cylinder internal combustion engine 10 having a piston 11 reciprocally movable in a cylinder 12, respective intake and exhaust valves 9 and 8, respectively communicating with intake manifold 13 and exhaust manifold 26. A turbocharger 14 including a compressor 16 is disposed between the fuel/air intake 23 and the intake manifold 13, such that the fuel/air mixture, is drawn from a fuel/air source, not shown, in the form of a carburetor or fuel injector of conventional construction. The compressor 16 is coupled by a shaft 29 to a turbine 17, disposed in the exhaust gas flow between the exhaust manifold 26 and the exhaust gas exit 31, typically including an exhaust muffler, not shown.

The compressor 16 has a compressor inlet 24 in fluid communication with the fuel/air intake 23 and a compressor outlet 32 in fluid communication with the intake manifold 13.

A dedicated recirculating loop 18 having a loop outlet 22. communicating with the compressor inlet 24 and a loop inlet 21 communicating with the compressor outlet 32, provides a recirculating path 18 around the compressor 16 for recirculating fuel/air mixture through the compressor when the engine is operating at reduced power setting, when power boost is not wanted.

A recirculating control valve 19 is inserted in the recirculating loop 18 and has a fully open position shown by phantom line 19' and a fully closed position, shown in phantom line 19''.

At full power setting the recirculating valve 19 will be in the fully closed position 19'', while at idling power setting the control valve 19 will be in fully open position 19'. At intermediate power settings, the control valve 19 will be at some intermediate position between fully open 19' and fully closed 19''.

Figure 4:
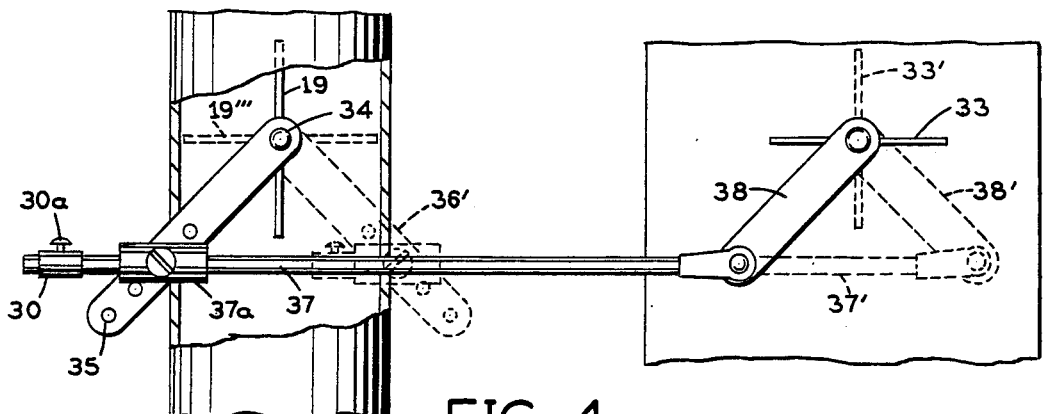
FIG. 4 is a diagrammatic view of a recirculating valve mechanically linked to the engine throttle valve.

The recirculating control valve 19 is controlled by a mechanical linkage or other valve control system which is responsive to engine variables. FIG. 4 shows an embodiment of a control system, which includes linkage to the throttle control linkage. In FIG. 4, the recirculating control valve 19 is pivotally suspended about a pivot pin 34 having a control lever 36 attached thereto. The control lever 36 is connected via a connecting rod 37 slidably suspended by bushing 37a which is in turn attached to the control lever 36 at one of a number of selectable holes 35 in the control lever 36 to a throttle lever 38, attached to the throttle valve 33. An adjustable stop 30 is clamped to the connecting rod 37 by a set screw 30a. The throttle valve is in turn connected to the throttle valve linkage, not shown, for operating the throttle.

The throttle valve 33 is shown in a low power setting in which the recirculation control valve 19 is shown in its wide open position, allowing full recirculation of the fuel/air mixture; since the flow of fuel/air mixture is much reduced, most of the fuel/air mixture flows through the recirculation loop 18. As a result, the fuel/air mixture becomes more completely mixed, which leads to better engine efficiency under the condition of a low power setting.

When increased power is required from the engine, the throttle valve 33 is turned to a wider open position 33' shown in phantom line 33', and at the same time the recirculation control valve 19 is turned to the position indicated as 19''' in phantom line, completely closing the flow of air in the recirculation loop 18 as the connecting rod 37 is moved to the right hand side, as shown in phantom lines 37', and the stop 30 engages the bushing 37a. As a result, the fuel/air mixture issuing from the compressor 16 instead of recirculating in the loop 18 is directed under pressure from the compressor 16 into the intake manifold boosting the engine power. Due to the inertia of the compressor and turbine wheels and the moving column of air, power boosting is quickly attained while the engine power output quickly rises, and the increased volume of exhaust gas further accelerates the turbine to further increase the power output so that full engine power is quickly reached. In this way undue "turbo lag" is almost completely eliminated, since the turbo charger is kept running at a relatively high RPM, even during lower power setting or idling due to the presence of the recirculation loop.

Figure 6:
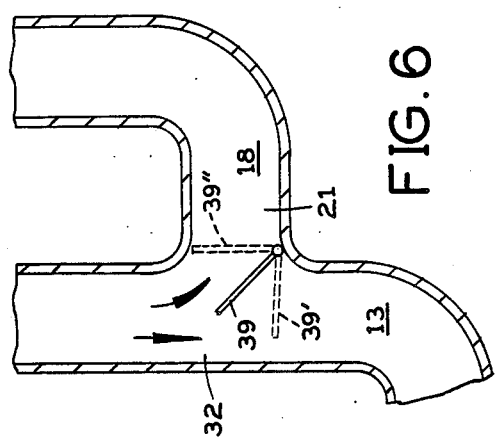
FIG. 6 is a diagrammatic view of the recirculation valve in its three-port embodiment.
Figure 2:
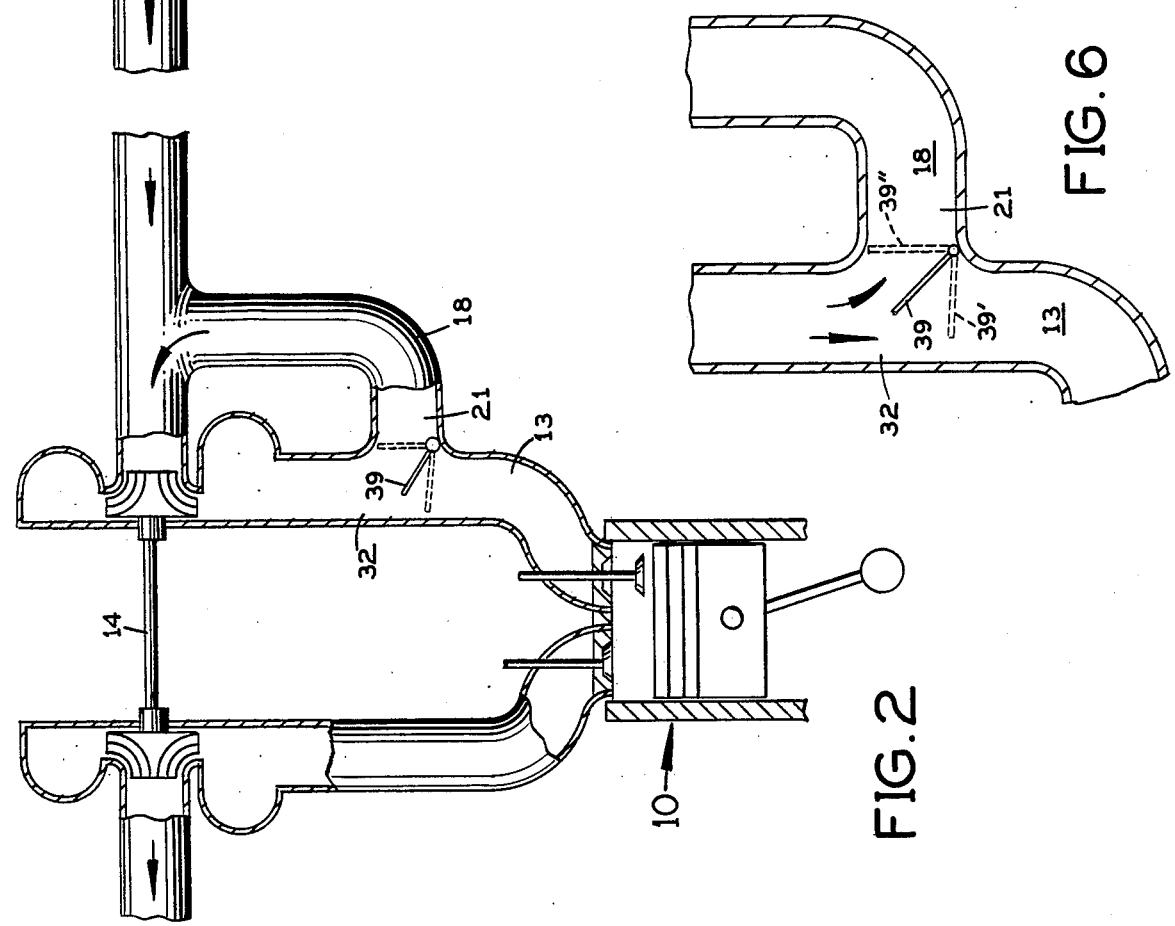
FIG. 2 is a diagrammatic view of an engine with a turbocharger according to the inventive concept, having a three-way recirculating valve.

In another embodiment of the invention seen in FIG. 2, the recirculation control valve is arranged as a three-way valve 39 connecting together the loop inlet 21, the compressor outlet 32 and the intake manifold 13. The three way valve 39 is shown in FIG. 6 in an enlarged diagrammatic detail figure, showing the valve 39 in a midway position between position 39'', closing the recirculation loop inlet 21, and position 39', completely opening the recirculation loop inlet 21 and almost closing the manifold inlet 13, respectively. Positions 39' and 39'' are shown in phantom lines.

In operation, the three-way valve 39, during idling or low power setting will be in position 39' allowing a small amount of fuel/air mixture into the engine and full recirculation of the fuel/air mixture in the dedicated recirculation loop 18, while at position 39", representing a high or full power setting the recirculation loop 18 is blocked and the intake inlet 13 is completely pen.

Figure 3:
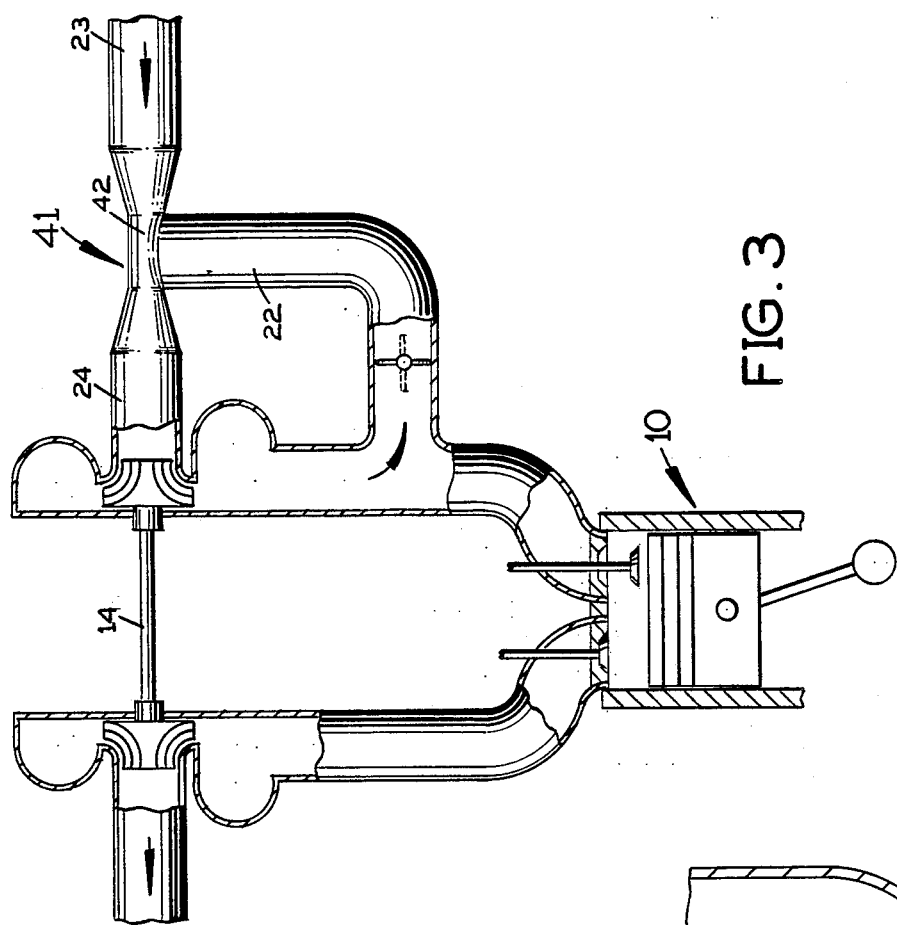
FIG. 3 is a diagrammatic view of an engine with a turbocharger according to the inventive concept having a venturi in the fuel/air intake fluidly connected with the recirculating loop.

In an embodiment of the invention seen in FIG. 3, a venturi 41 is disposed between the fuel/air intake 23 and the compressor inlet 24, with the recirculating loop inlet 22 connected to the throat 42 of the venturi. In this embodiment, when fuel/air mixture is drawn into the engine a low pressure is developed at the throat of the venturi, which will improve mixing of the recirculating fuel/air mixture before it enters the engine.

Figure 5A:
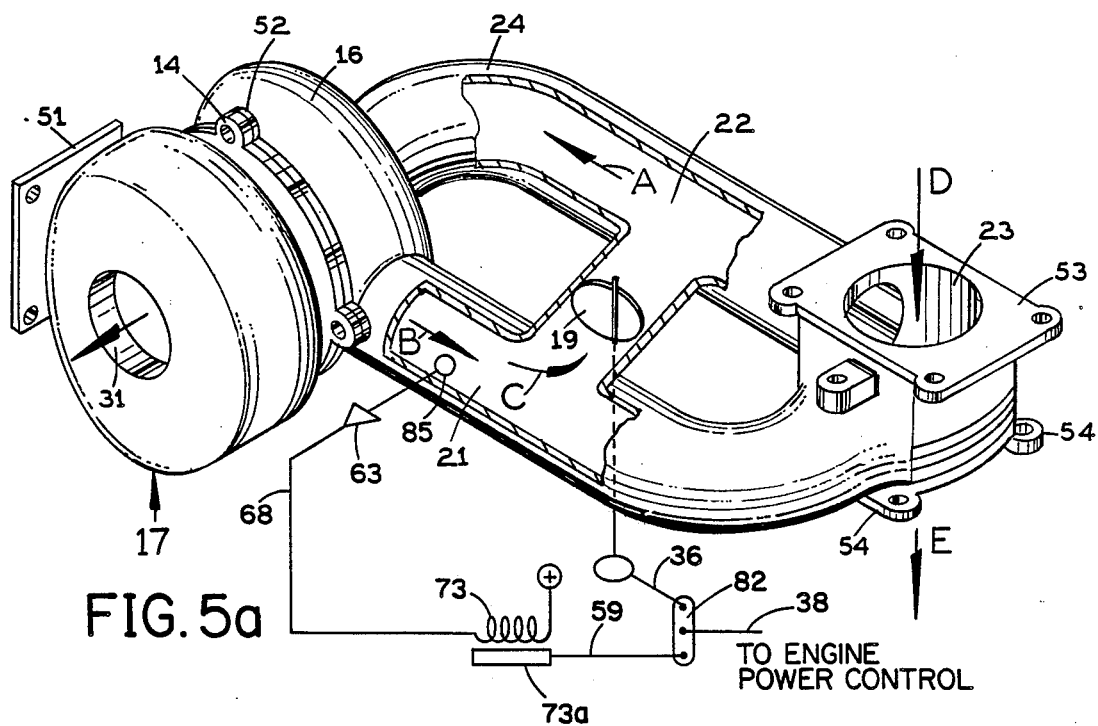
FIG. 5a is a perspective view of a turbocharger compressor, and a recirculating loop with a carburetor mounting flange.

FIG. 5a is a perspective view of an assembly including the turbocharger 14, the turbine housing 51 and the compressor housing 52. The mounting flange 53 for mounting a carburetor shows the fuel/air intake 23 with fuel/air flow indicated by arrow D. The compressor inlet 24 is seen through the partially broken away side wall of the assembly, as well as the compressor outlet 21. The entire assembly bolts onto the engine intake manifold at bolt holes 54.

The recirculation valve 19 is seen in FIG. 5a. The turbine 17 is seen mounted onto the compressor 16 and having an intake 51 connected to the engine exhaust passage, not shown. The turbine outlet 31 leads to the engine exhaust system, including mufflers, etc., which is not shown.

Figure 5B:
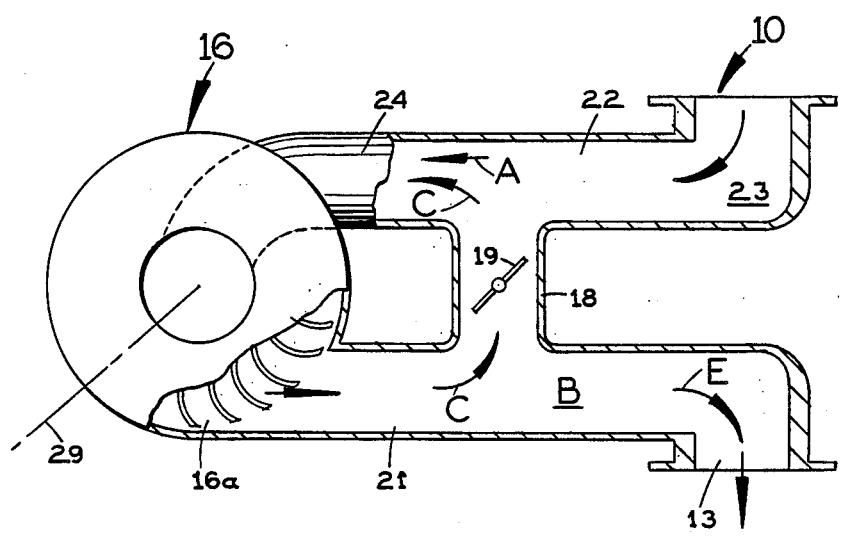
FIG. 5b is a diagrammatic view of the invention showing its basic elements.

FIG. 5b is a diagrammatic view of the invention showing the elements of FIG. 5a such that the air flows are more clearly seen. In FIG. 5b, the fuel-air mixture entering at 23 flows via the compressor inlet 24, the compressor 16, the compressor outlet 21 and the intake manifold 13 into the engine's intake valves 9. The compressor outlet 21 and inlet 24 are connected by the dedicated recirculation loop 18 which includes the recirculation valve 19 which in turn controls the amount of recirculation of fuel-air mixture around the compressor 16.

FIG. 1 shows a waste-gate 27 having a valve head 56 slidably connected by valve rod 59 to a waste-gate control unit 58, which is in turn controlled by control input 57 as described in more detail below. The control 58 controls the state of the waste-gate 27 such that the turbine 17 or the engine 10 is protected against being overstressed.

Figure 7:
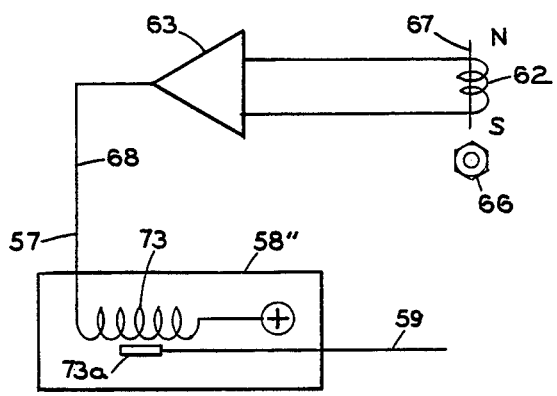
FIG. 7 is a circuit block diagram of the controls for a waste gate or recirculation valve controlled by a compressor wheel sensor.

FIG. 7 shows a version of the waste-gate control arrangement in more detail. A speed monitor 62 also seen in FIG. 1 is coupled to an amplifier 63 that produces an output 68 proportional with the compressor RPM. The sensor 62 includes a magnet 67 having one pole(s) proximal to the compressor wheel 16 or a nut 66 on the shaft 29 and has a pickup winding 62. As the compressor wheel rotates, magnetic pulsations are generated in the magnet 67 and are inductively coupled to the pickup coil 66 which generates a frequency proportional with the number of blades on the compressor wheel 16 or the number of edges of the nut 66 and its speed of rotation. The output is amplified in amplifier 63 which in turn is connected to a solenoid 73 in the waste-gate control unit 58", which in turn is coupled to the waste-gate valve 56 via valve rod 59 and a solenoid armature 73a.

Figure 8:
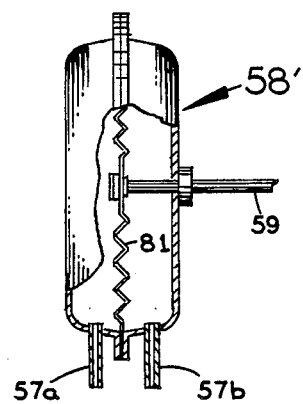
FIG. 8 is a pressure-operated waste gate or recirculation valve actuator controlled by pressure from the fuel-air passage.

In another control arrangement, the waste-gate may be controlled by the amount of airflow by means of a venturi 59 (FIG. 1). Airflow through the venturi throat creates pressure differential between the tube 57a connected to the venturi throat and the tube 57b connected behind the venturi. At increasing airflow the pressure in tube 57a will be increasingly lower than in the tube 57b, due to venturi action. The tubes 57a and 57b are connected to a waste-gate control unit 58 seen in FIG. 8, having a diaphragm 81 having opposite sides connected to tubes 57a and 57b and being mechanically coupled to the waste-gate 27 via the valve rod 59. At airflow above a certain degree, the pressure differential between tubes 57a and 57b will cause the diaphragm 81 to open the waste-gate by drawing the valve rod 59 toward the left hand side of FIG. 8.

In still another control arrangement, the pitch of the vibration of the airflow through the compressor is monitored by a microphone connected to a pitch-responsive control circuit, e.. such as a phase-locked loop circuit which in turn controls the waste-gate.

In still another control arrangement, the waste-gate is controlled simply by the air pressure in the intake manifold as measured at the tube 57b connected to the diaphragm of the waste-valve control unit 58 without the tube 57a and the venturi 59 being present. In this case pressure on the right hand side of the diaphragm 81 operates to open the waste-gate, if the pressure exceeds a certain value.

Still other control arrangements for the waste-gate can be used. For example, a pitot tube 74 may be inserted into the outlet of the compressor ahead of the recirculation loop inlet 21 as shown in FIG. 1. The air pressure from the pitot tube in turn engages the waste-gate 27 by conventional pressure sensing means such as diaphragms or the like as described hereinabove.

In an important mode of the invention, the waste-gate can be eliminated altogether, especially in medium-performance engines, by means of the recirculation loop, and appropriate controls of the recirculation valve. In this mode, the controls for the recirculation valve are arranged such that upon detecting excessive pressure in the engine intake manifold, the setting of the valve is modified to increase the recirculation, which in turn reduces the intake manifold pressure to an acceptable level.

Eliminating the waste-gate has significant advantages in that the problems and expense attendant to the waste-gate, such as sticking valve, and problems with the valve control are eliminated.

In the mode using no waste-gate, the control of the recirculation valve is expanded to be responsive, not only to the engine power setting, e.g. the linkage from the butterfly valve to the recirculation valve shown in FIG. 4, but must be expanded to also respond to excessive manifold pressure.

The manifold pressure can in this mode again, as described above in connection with the waste-gate control, be monitored by the airflow in the intake, the intake manifold pressure or a combination thereof. In other words, the waste-gate control unit 58, instead of activating the waste-gate will be arranged to engage the recirculation valve control such that recirculation is increased.

Figure 9:
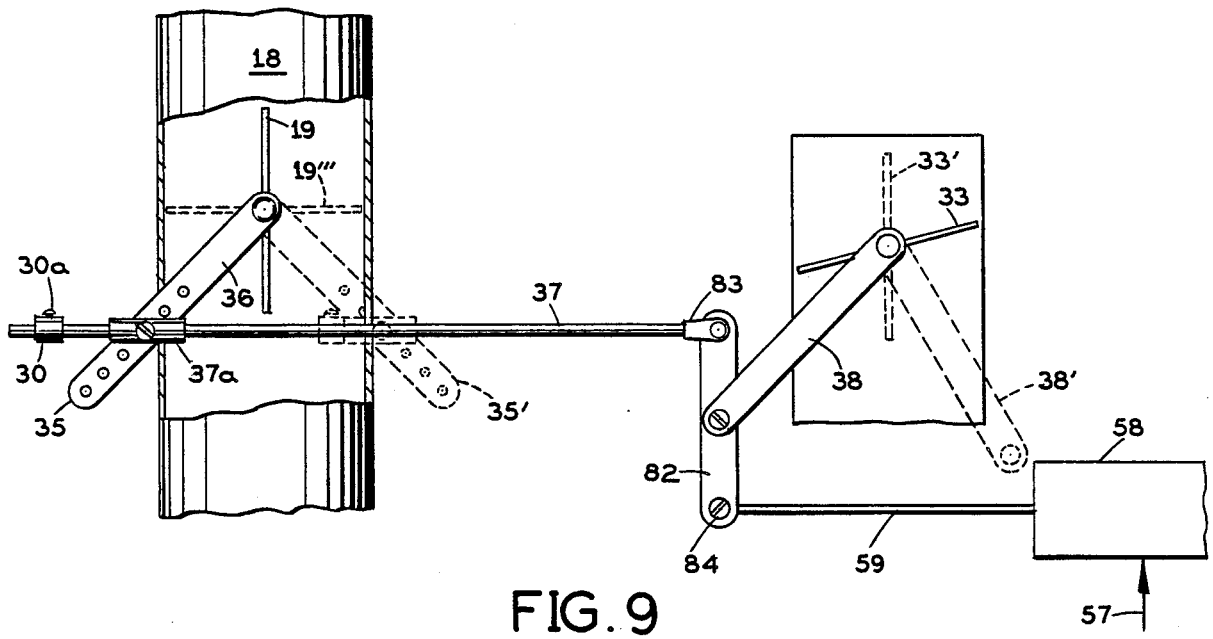
FIG. 9 is a mechanical control linkage for a recirculation valve, being responsive to both throttle valve position and engine load setting.

One such arrangement is shown in FIG. 9, which is an extension of the linkage of FIG. 4, further showing the waste-gate control unit 58 connected with its valve rod 59 to a lower pivot point 84 of an additional toggle link 82, which is pivotally linked at an upper pivot point 83 to the connecting rod 37. In operation as described in connection with FIG. 4, at increasing power settings, the butterfly valve 33 moves toward the position shown as 33' and at the same time operates to close the recirculating valve 19, by drawing the connecting rod 37 toward the right hand side. As the power increases, the control unit 58 monitors the increasing manifold pressure or air flow, and when the latter exceeds a certain given value, the valve rod 59 is pulled toward the right hand side. Due to the presence of the toggle link 82, the closing of the recirculation valve 19 is counteracted, and recirculation is again increased, which in turn operates to reduce the manifold pressure or airflow, thereby preventing over-boosting the engine.

It follows that a similar result may be attained with other forms of linkage, including electronic controls that include logic elements or arithmetic elements.

Such controls may include logic AND-, OR-, NOR- gates, flip-flops, inverters and the like, a microcomputer which includes a control program stored in memory, and which responds to engine variables such as power setting, manifold pressure, engine RPM, exhaust gas compositions and temperature and engine temperature, ignition timing, engine knocking, barometric pressure and the like, and combine these variables in accordance with an algorithm for providing control of the setting of the recirculation valve and/or a waste-gate.

I claim:

1. Turbocharger control device for an internal combustion engine having an exhaust turbine having an inlet and an outlet, a compressor also having an inlet and an outlet, coupled to the turbine, disposed between the engine fuel/air mixture source and the engine intake manifold, and control means coupled to the engine fuel/air mixture source, comprising: a dedicated recirculation loop means for recirculation having an inlet and an outlet in fluid communication with the respective compressor outlet and inlet; a recirculation control valve disposed in the recirculation loop for controlling the amount of recirculating fuel/air mixture circulating in the loop, and recirculation valve control means controllingly engaging the recirculation valve for controlling the amount of fuel/air mixture flow in the recirculation loop.

2. Turbocharger control device according to claim 1 including a waste-gate disposed in the engine exhaust port ahead of the turbine providing an exhaust outlet for limiting stress on the engine; engine power monitor means; waste-gate control means operatively responsive to said power monitor coupled to the waste-gate to protect the engine against overloading.

3. Turbocharger control device according to claim 1 including recirculation control linkage responsively coupled to the engine power control means said linkage operatively engaging the recirculation valve for providing decreasing recirculation at increased power setting for said power control means.

4. Turbocharger control device according to claim 3 wherein said recirculation control linkage includes a control lever rigidly connected to a pivot point of the recirculation control valve, a throttle lever rigidly connected to the power control means and a connecting rod pivotally connected at each end to the respective control lever and throttle lever for operatively connecting said control lever to the throttle lever.

5. Turbocharger control device according to claim 4 wherein said control lever includes a plurality of axially spaced holes for attaching the respective end of the connecting rod to a hole having a selected distance from the pivot point of the recirculation valve.

6. Turbocharger control device according to claim 5 including a bushing pivotally attached to a selected one of said axially spaced holes, for slidably receiving the respective end of said connecting rod; and an adjustable stop adjustably attached to the end of said connecting rod, which is disposed distally beyond the bushing in direction away from the end of the connecting rod, pivotally attached to the throttle lever.

7. Turbocharger control device according to claim 2 wherein said waste-gate control means include a temperature waste-gate control unit being operatively responsive to the engine power setting for opening the waste-gate at a greater than acceptable power setting.

8. Turbocharger control device according to claim 2 wherein said engine monitor means include at least one element selected from the group consisting of: a compressor outlet pressure sensor, an intake manifold airflow sensor, a compressor RPM sensor, a compressor vibration pitch sensor, engine RPM sensor, exhaust gas composition sensor and temperature sensor, ignition timing, engine knocking sensor, barometric pressure sensor and throttle position sensor.

9. Turbocharger control device according to claim 8 wherein said intake manifold pressure sensor includes a diaphragm being in fluid communication with the intake manifold and a valve rod coupled to the diaphragm.

10. Turbocharger control device according to claim 8 wherein said airflow sensor includes a venturi disposed in the path of the engine fuel/air flow, a differential air pressure sensor in fluid communication with said venturi; a diaphragm being responsive to the differential air pressure, and a valve rod being connected to the diaphragm.

11. Turbocharger control device according to claim 8 wherein said compressor RPM sensor includes a magnetic sensor coupled magnetically to the compressor wheel or nut, an amplifier having an input connected to the magnetic sensor and a valve actuator coupled to the output of the amplifier.

12. Turbocharger control device according to claim 8 wherein said vibration pitch sensor includes a microphone acoustically coupled to the compressor, an amplifier having an input connected to the microphone, and a valve actuator connected to the output of the amplifier.

13. Turbocharger control device according to claim 1 including engine power monitor means in cooperative engagement with said engine control means, operatively engaging said recirculation valve for maintaining said engine power within a given limit.

14. Turbocharger control device according to claim 13 wherein said engine power monitor means include at least one element selected from the group of sensors consisting of: an intake manifold pressure sensor, an airflow sensor, a compressor RPM sensor and a compressor audio frequency sensor.

15. Turbocharger control device according to claim 14, wherein said intake manifold pressure sensor includes a diaphragm being in fluid communication with the intake manifold and a valve rod coupled to the diaphragm.

16. Turbocharger control device according to claim 14, wherein said airflow sensor includes a venturi disposed in the path of the engine fuel/air flow; a differential air pressure sensor in fluid communication with said venturi, a diaphragm being responsive to the differential air pressure, and a valve rod being coupled to the diaphragm.

17. Turbocharger control device according to claim 15 wherein said compressor RPM sensor includes a magnetic sensor, magnetically coupled to the compressor wheel or nut, an amplifier having an input connected to the magnetic sensor; and a solenoid coupled to the output of the amplifier.

18. Turbocharger control device according to claim 14 wherein said air vibration pitch sensor includes a microphone; an amplifier having an input connected to the microphone; and a valve actuator coupled to the output of the amplifier.

19. Turbocharger control device according to claim 1 wherein said recirculation control valve is a three-way valve having a common input in fluid communication with the output of said compressor, a first output in fluid communication with the input of said recirculation loop and a second output in fluid communication with the input of said intake manifold.

20. Turbocharger control device according to claim 1 including a venturi disposed in the input to said compressor and a venturi throat connected to the output of said recirculation loop.

21. Turbocharger control device according to claim 14 wherein said recirculation valve control means includes linkage being responsively engaged by the throttle control linkage for operatively controlling the recirculation valve.

22. Turbocharger control device according to claim 14 wherein said recirculation valve control means include recirculating valve control linkage having a toggle link having a center being pivotally engaged by the engine power control means; a first end pivotally engaging the recirculation valve control means; and the opposite end pivotally in operative engagement with said engine power monitor means.

23. Supercharger control device for an internal combustion engine having a compressor having an inlet and an outlet, coupled to the engine, disposed between the engine fuel/air mixture source and the engine intake manifold, and control means coupled to the engine fuel/air mixture source, comprising: a dedicated recirculation loop means having an inlet and an outlet in fluid communication with the respective compressor outlet and inlet; a recirculation control valve disposed in the recirculation loop means for controlling the amount of recirculating fuel/air mixture circulating in the recirculation loop, and recirculation valve control means controllingly engaging the recirculation valve for controlling the amount of fuel/air mixture flow in the recirculation loop.

* * * * *